United States Patent
Ogawa et al.

(10) Patent No.: US 6,520,293 B1
(45) Date of Patent: Feb. 18, 2003

(54) OIL CIRCULATING APPARATUS FOR AUTOMATIC TRANSMISSION

(75) Inventors: Hiroshi Ogawa, Tokyo (JP); Mamoru Murakami, Tokyo (JP); Jun Nakayama, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/593,365

(22) Filed: Jun. 14, 2000

(30) Foreign Application Priority Data

Jun. 28, 1999 (JP) ............................................. 11-182299

(51) Int. Cl.[7] ................................................. F01M 5/00
(52) U.S. Cl. ..................... 184/6.22; 74/606 R; 475/159
(58) Field of Search ............................... 184/6.12, 6.22, 184/6.24, 104.2; 74/606 R, 606 A; 475/159, 161

(56) References Cited

U.S. PATENT DOCUMENTS

| | | | | |
|---|---|---|---|---|
| 1,906,538 A | * | 5/1933 | Church ...................... | 184/6.22 |
| 4,352,737 A | * | 10/1982 | Taniguchi .................... | 210/455 |
| 4,366,724 A | * | 1/1983 | Yamamori et al. ............. | 74/467 |
| 4,903,798 A | * | 2/1990 | Takemoto et al. ........... | 184/6.24 |
| 4,922,765 A | * | 5/1990 | Hayakawa et al. ......... | 184/6.12 |
| 5,050,447 A | * | 9/1991 | Hayakawa et al. ....... | 74/606 R |
| 5,222,418 A | * | 6/1993 | Murota ........................ | 184/6.12 |
| 5,971,719 A | * | 10/1999 | Takeuchi ..................... | 417/307 |

FOREIGN PATENT DOCUMENTS

| | | |
|---|---|---|
| JP | 8246835 | 9/1996 |
| JP | 1122811 | 1/1999 |

* cited by examiner

*Primary Examiner*—Chong H. Kim
(74) *Attorney, Agent, or Firm*—Martin A. Farber

(57) ABSTRACT

A part of oil sucked by an oil pump is circulated to an oil pan through a hydraulic control circuit, an oil cooler and an oil passage provided in a transmission case and the oil pan. The oil guided to the oil pan is gushed out from a discharge port of the oil passage toward a suction port of an oil strainer communicating with the oil pump. The discharge port of the oil passage is disposed opposite and adjacent to the suction port of the oil strainer so that only the oil containing a small number of bubbles is sucked by the oil pump.

3 Claims, 6 Drawing Sheets

OIL CIRCULATING APPARATUS FOR AUTOMATIC TRANSMISSION

BACKGROUND OF THE INVENTION

1. Field of the Invention

The present invention relates to an oil circulating apparatus for an automatic transmission and more particularly to an oil circulating apparatus in which air jam noise can be reduced by supplying an oil containing a small number of bubbles to an oil pump.

2. Discussion of the Background Art

Generally, automatic transmission fluid (ATF) for operating and lubricating an automatic transmission including a multi-stage transmission and a continuously variable transmission, is reserved in an oil reservoir such as oil pan and the like provided under the automatic transmission. The automatic transmission fluid reserved in the oil pan is sucked up by an oil pump through an oil strainer and supplied to a torque converter, miscellaneous lubrication parts, a hydraulic servo mechanism and the like, after being regulated to a specified pressure in a hydraulic circuit. The automatic transmission fluid discharged from the servo mechanism and the lubrication parts is returned directly to the oil reservoir and the automatic transmission fluid (hereinafter, referred to as ATF) discharged from the torque converter is circulated to the oil reservoir after being cooled by an oil cooler.

In the automatic transmission, since the ATF is agitated by miscellaneous rotation members such as a planetary gear set, a final gear set, miscellaneous friction devices, a belt type driving force transmitting mechanism and the like, the ATF is returned to the oil reservoir while many bubbles are contained therein and the ATF containing bubbles is sucked up by the oil pump. As a result, an air jam noise is generated from the oil pump.

Japanese Patent Application Laid-open No. Toku-Kai-Hei 11-22811 proposes a technique for reducing the number of bubbles contained in oil when oil is sucked up by an oil pump. Specifically, in this disclosure, a guiding means provided in an oil pan first guides stream of lubricating oil in an opposite direction to an inlet of an oil strainer, reduces the flow speed of oil, breaks wave, stabilizes an oil level and finally introduces lubricating oil containing a small number of bubbles to the inlet of the oil strainer.

Further, Japanese Patent Application Laid-open No. Toku-Kai-Hei 8-246835 discloses a technique in which a protruding portion is provided on a relief valve side of an oil strainer, a suction port of an oil strainer is disposed on a side of the protruding portion and at a higher position than the protruding portion so as to prevent the lubricating oil gushed out of the relief valve from coming into the suction port of the oil strainer together with bubbles.

However, according to the technique disclosed in Toku-Kai-Hei 11-22811, the stream of lubricating oil discharged from the oil cooler to the oil pan is once guided in the opposite direction to the inlet port of the oil strainer, however, it is difficult to remove bubbles contained in lubricating oil completely and therefore it is impossible to suppress the generation of the air jam noise.

On the other hand, according to the technique disclosed in Toku-Kai-Hei 8-246835, although the oil discharged from the relief valve can be prevented from the mixing-in of bubbles, in case where bubbles mix in lubricating oil as a result of the agitation by rotating members of the automatic transmission, it is also impossible to prevent the mixing-in of bubbles completely and therefore the generation of air jam noise can not be suppressed.

SUMMARY OF THE INVENTION

It is an object of the present invention to provide an oil circulating apparatus of an automatic transmission capable of suppressing the generation of air jam noise from the oil pump.

An oil circulating apparatus of an automatic transmission comprises an oil passage provided downstream of an oil cooler, an oil strainer provided in an oil reservoir and connected with the suction side of the oil pump, a discharge port of the oil passage provided at an downstream end of the oil passage and an suction port of the oil strainer provided opposite and adjacent to the discharge port.

PREFERRED EMBODIMENT OF THE INVENTION

Figure 1:
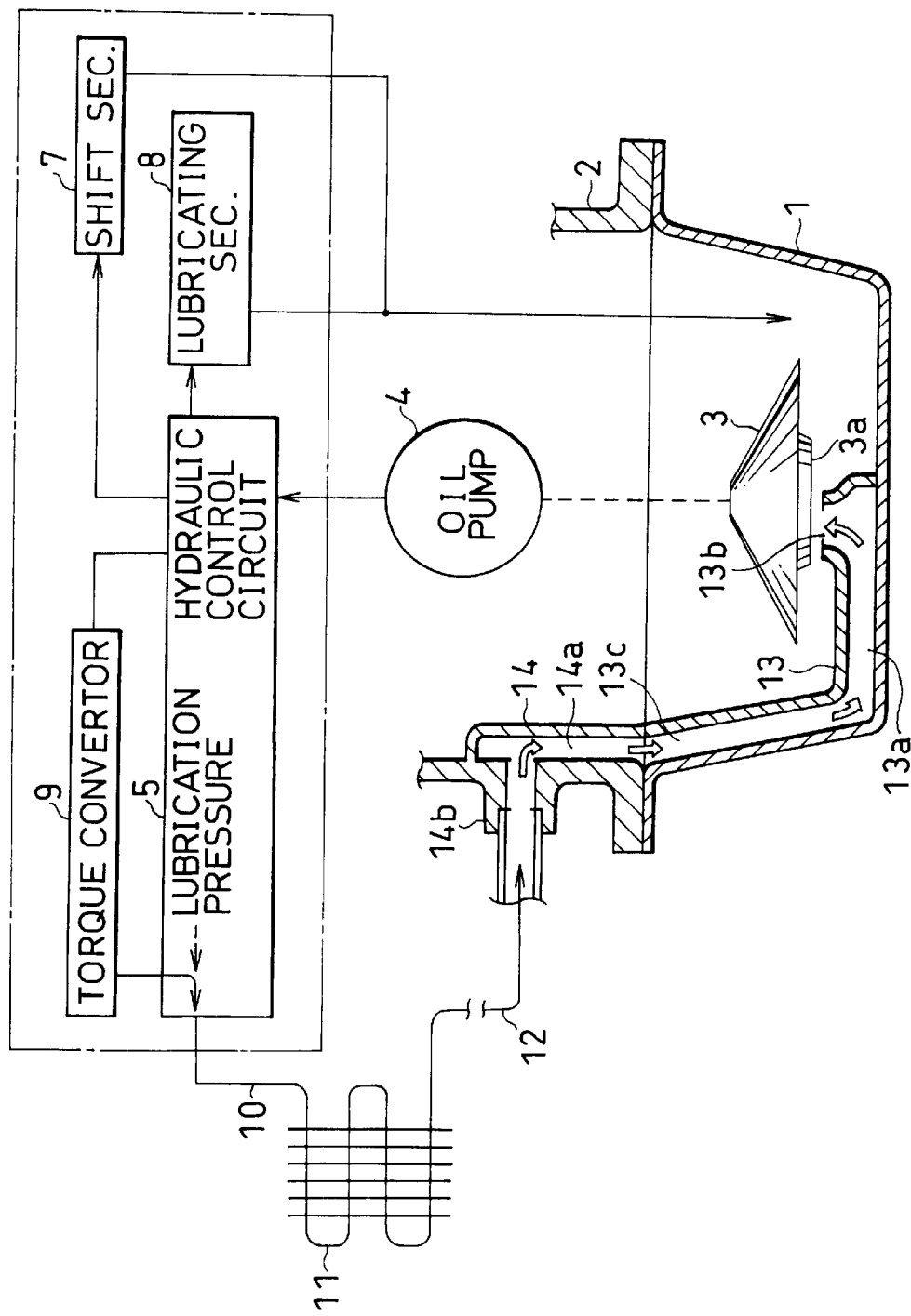
FIG. 1 impartially a schematic view showing a hydraulic circuit of an automatic transmission according to a first embodiment of the present invention and partially a sectional view taken along a line I—I of FIG. 2.
Figure 2:
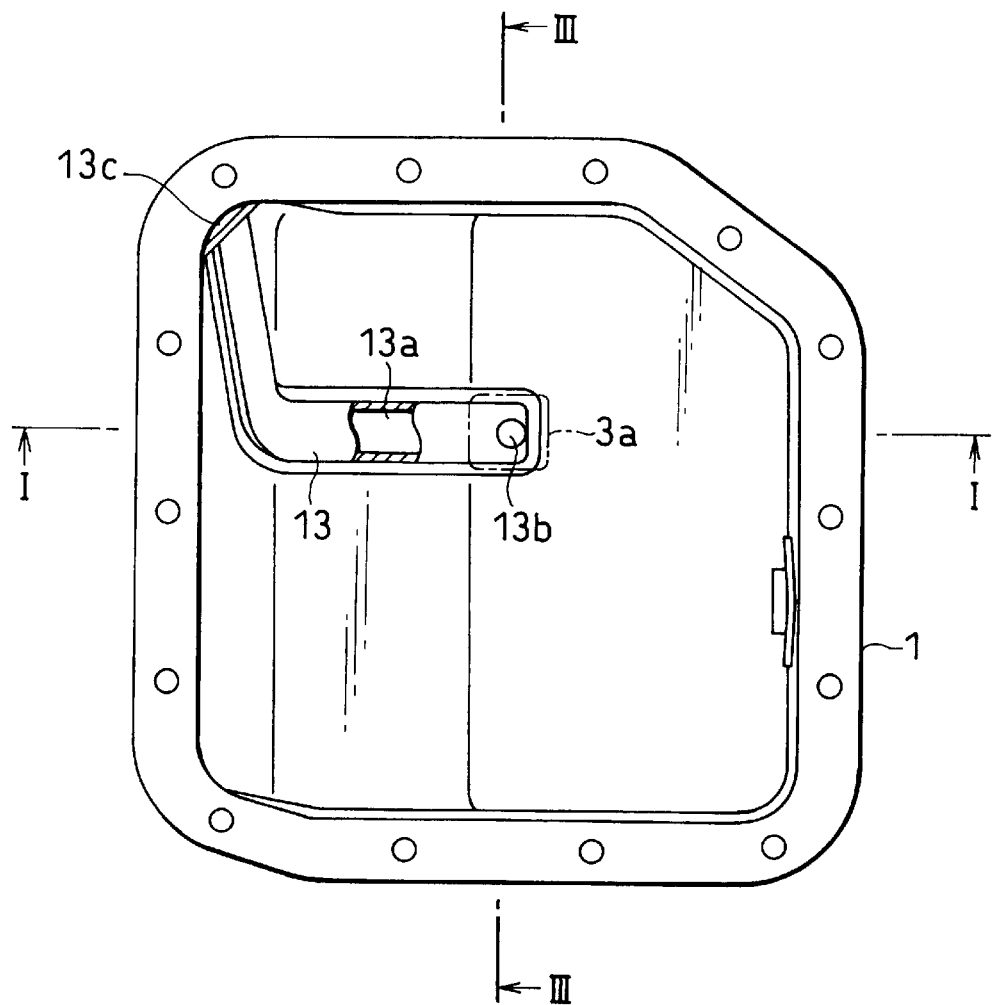
FIG. 2 is a top view of an oil pan according to a first embodiment of the present invention.
Figure 3:
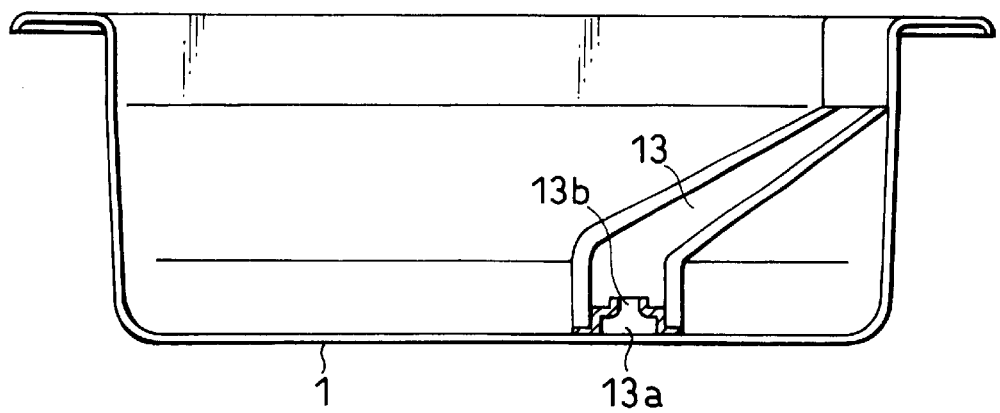
FIG. 3 is a sectional view taken along a line III—III of FIG. 2.
Figure 4:
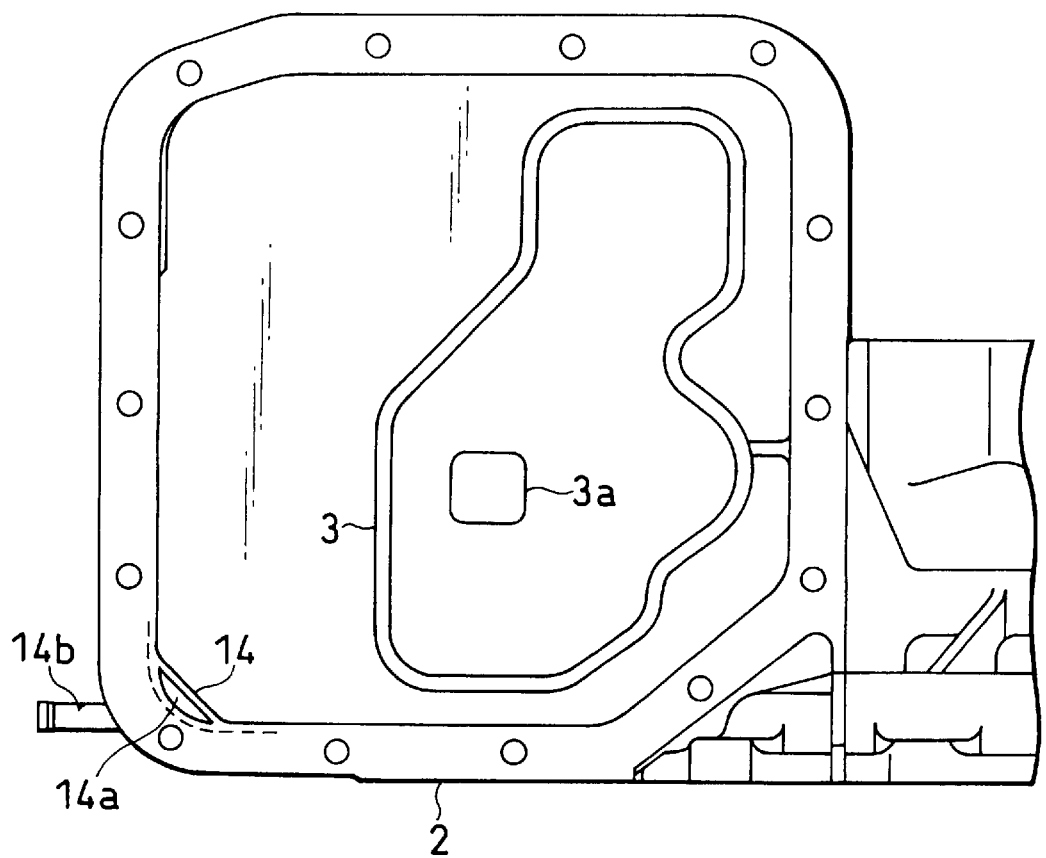
FIG. 4 is a bottom view of a transmission case.

Referring now to FIG. 1, reference numeral 1 denotes an oil pan secured to a bottom surface of a transmission case 2 through a gasket (not shown) and an automatic transmission fluid (ATF) is reserved in the oil pan 1. Further, reference numeral 3 denotes an oil strainer and a suction port 3a of the oil strainer 3 is provided opposite to a bottom surface of the oil pan 1. The oil strainer 3 communicates with a suction side of an oil pump 4 driven by an engine or an electric-motor.

A discharge side of the oil pump 4 communicates with a hydraulic circuit 5 provided in the transmission case 2 and mainly composed of a control valve unit for controlling the transmission. The discharge side of the hydraulic circuit 5 communicates with a shift section 7 such as shift clutches for changing speeds and actuators for operating shift brakes, a lubricating section 8 for supplying lubrication oil to transmission gears, sliding and rotating components and the like, and a torque converter 9.

A downstream portion of the hydraulic control circuit 5 is connected with an upstream portion of an oil cooler 11. Further, the oil cooler 11 is connected at a downstream portion thereof with an outer pipe 12.

On the other hand, a U-shaped oil guide 13 is spot-welded onto the inner wall of the oil pan 1 so as to form an oil passage 13a enclosed by the oil guide 13 and the inner wall surface of the oil pan 1. Further, the oil guide 13 extends to the bottom surface of the oil pan 1 and has a discharge port 13b upwardly open at the downstream end thereof. The discharge port 13b is disposed close and opposite to underneath of the suction port 3a of the oil strainer 3. The upstream end of the oil guide 13 extends upwardly along the inner wall surface of the oil pan 1 and communicates with an inlet port 13c formed at one of the corners of the opening side of the oil pan 1.

There is provided a downstream end of an oil passage 14a which communicates with the oil passage 13a on the mating surface of the transmission case 2 with the oil pan 1. This oil passage 14a is integrally formed with a reinforcement rib of the transmission case 2 and its upstream end communicates with an inlet port 14b outwardly projected from the transmission case 2. The inlet port 14b is connected with the outer pipe 12 communicating with the oil cooler 11.

Next, describing an operation of thus constituted embodiment, when the oil pump 4 operates, the ATF reserved in the oil pan 1 is sucked up through the suction port 3a to the hydraulic control circuit 5. The hydraulic pressure is regulated to a specified pressure in the hydraulic control circuit 5, then supplied to the shift section 7, the lubrication section 8, the torque converter 9 and the like and again returned to the oil pan 1.

The ATF discharged from the torque converter 9 is guided to the oil cooler 11 through the inlet pipe 10, and after being cooled down at a specified temperature, sent to the transmission case 2 through the outer pipe 12. Further, when a lockup clutch is engaged, the ATF sent to the torque converter 9 is reduced. The reduced amount of ATF is guided to the oil cooler 11 through a bypass circuit (not shown) and the inlet pipe 10.

The outer pipe 12 is connected with the inlet port 14b projected from the transmission case 2. The ATF which flows into the transmission case 2 is guided in the direction of the oil pan 1 through the oil passage 14a provided in the reinforcement rib 14 and flows into the inlet port 13c of the oil passage 13a provided in the oil pan 1 through the gasket inserted in the mating surface of the transmission case 2 and the oil pan 1.

The ATF is guided through the oil passage 13a to the discharge port 13b upwardly opened. Since the discharge port 13b is provided opposite to and close to the suction port 3a of the oil strainer 3, the ATF is gushed out toward the suction port 3a.

Thus, since the ATF discharged from the hydraulic control circuit 5 through the oil cooler 11 is guided directly to the suction port 3a of the oil strainer 3 through a separated passage from the drain passage from the shift section 7 and the lubrication section 8. As a result, it is possible to send the ATF containing a small number of bubbles to the oil strainer 3, thereby it becomes possible to reduce the air jam noise substantially.

Further, since the ATF returned from the oil cooler 11 is gushed out from the discharge port 13b towards the suction port 3a of the oil strainer 3, the ATF can be surely sucked into the suction port 3a without being affected by variations of the positions of the discharge port 13b and the suction port 3a.

Figure 5:
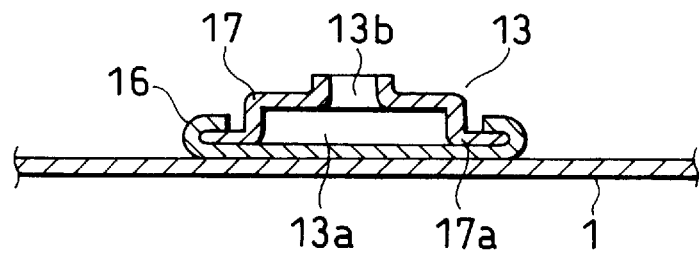
FIG. 5 is an enlarged sectional view of a variation of an oil guide.

FIG. 5 shows a variation of the first embodiment. In which, the oil guide 13 is constituted by a bottom plate 16 and a cover plate 17. A flange portion 17a formed at both edges of the cover plate 17 is caulked by a U-shaped edge of the bottom plate 16, respectively. The whole bottom plate 16 is spot-welded to the oil pan 1.

The feature of this variation is that, since the oil passage 13a is formed by the bottom plate 16 and the cover plate 17, when the bottom plate 16 is spot-welded to the oil pan 1, there is a small chance of oil leakage from the oil passage 13a.

Figure 6:
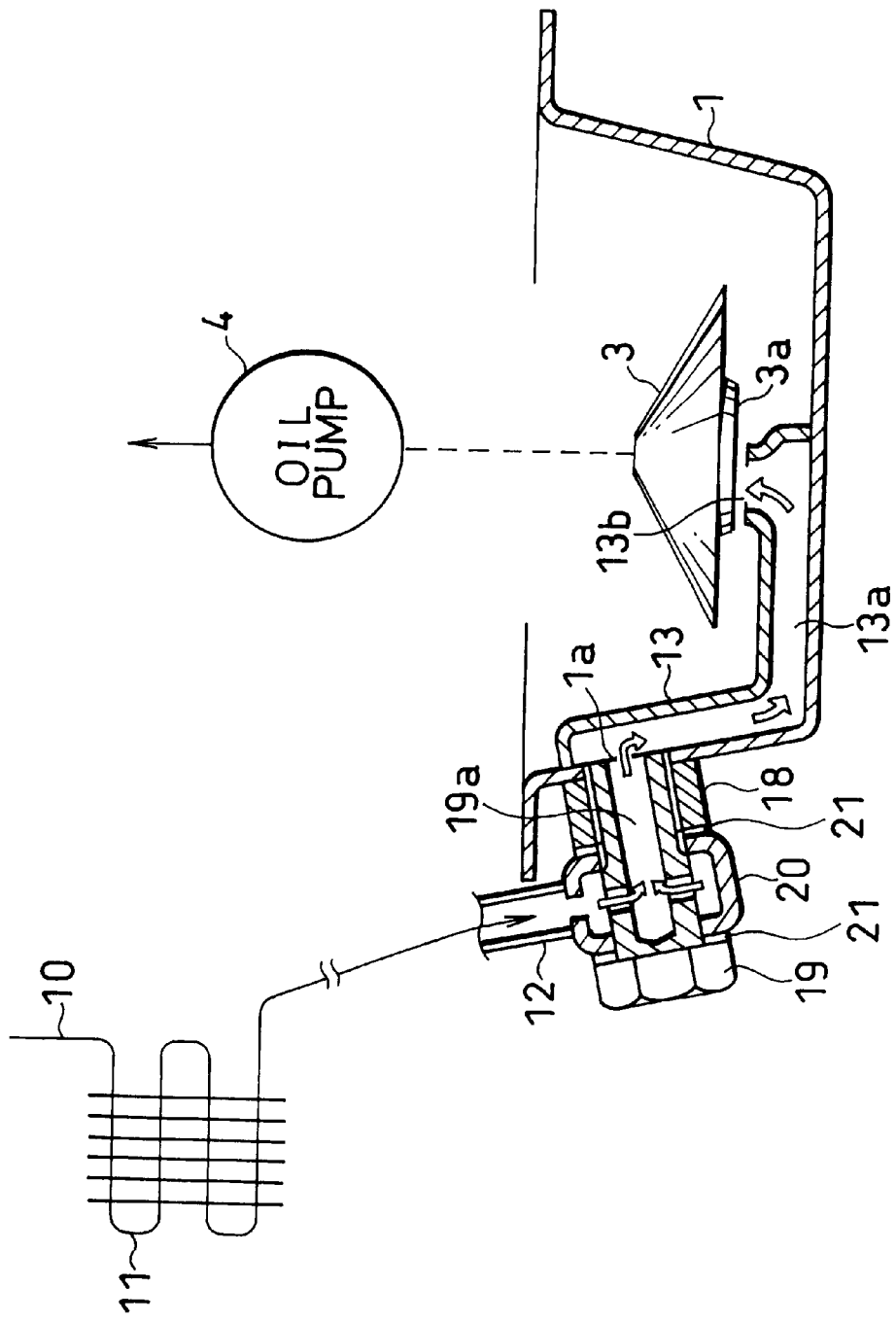
FIG. 6 is partially a schematic view showing a hydraulic circuit of an automatic transmission according to a second embodiment of the present invention and partially a sectional view taken along a line VI—VI of FIG. 8.
Figure 7:
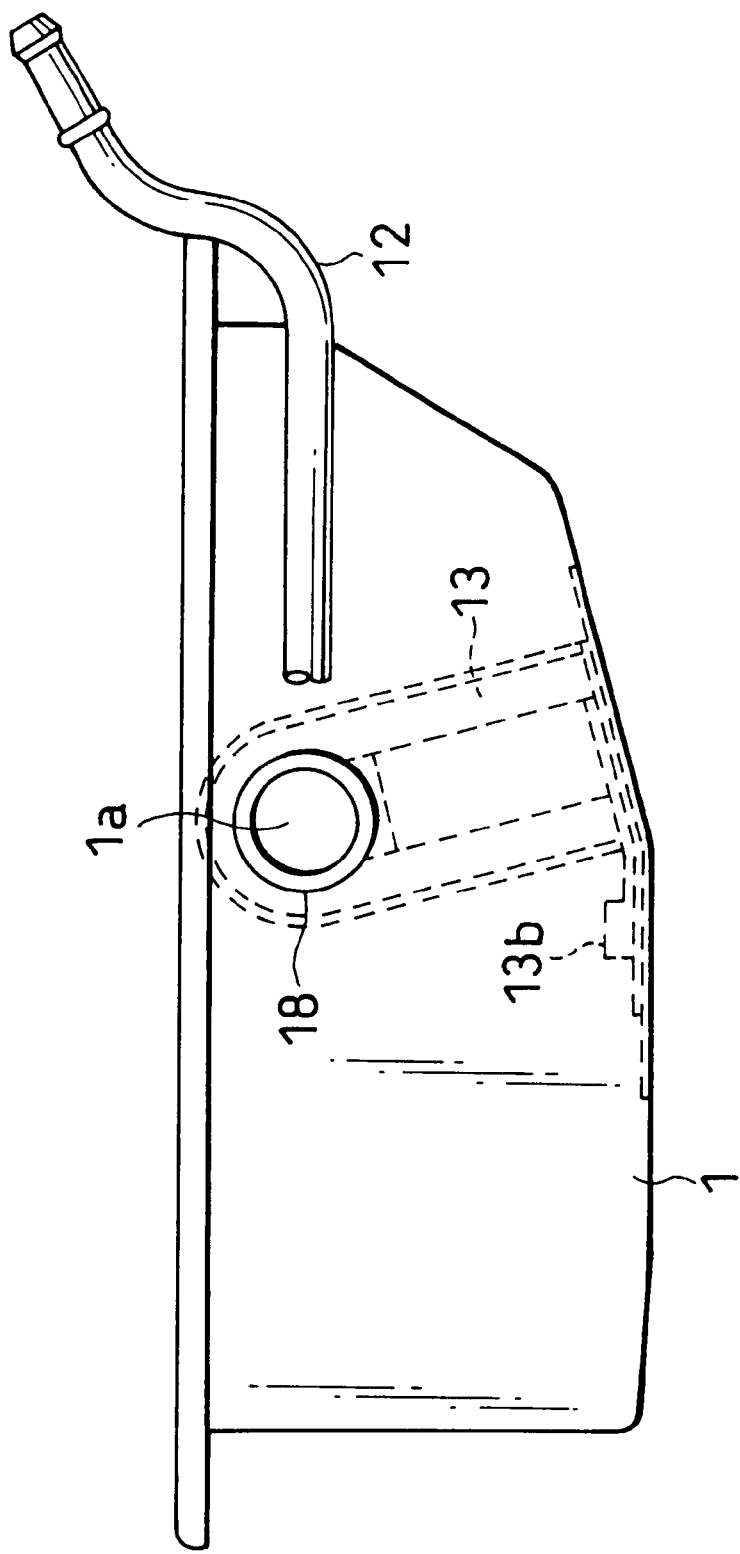
FIG. 7 is a side view of FIG. 8.
Figure 8:
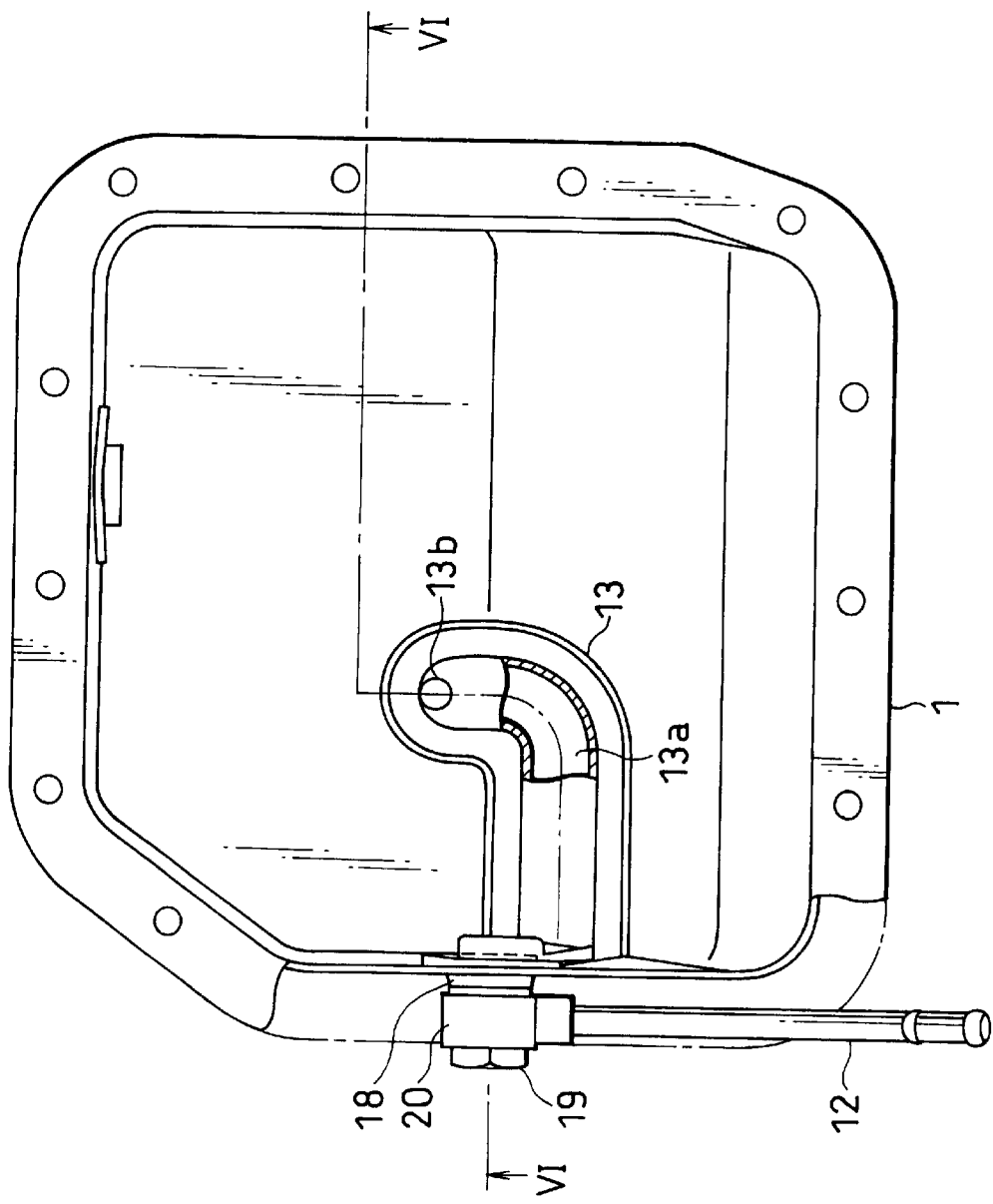
FIG. 8 is a top view of an oil pan according to a second embodiment of the present invention.

FIGS. 6 through 8 show a second embodiment of the present invention. FIG. 6 is a schematic view of a hydraulic circuit of an automatic transmission taken along a line VI—VI of FIG. 8. FIG. 7 is a side view as viewed from the left side of FIG. 8 and FIG. 8 is a top view of an oil pan.

In the first embodiment, the outer pipe 12 connected with the downstream of the oil cooler 11 communicates with the oil passage 13a through the oil passage 14a provided in the transmission case 2, however in this embodiment, the outer pipe 12 is directly connected with the oil pan 1. The feature of the embodiment is a simplification of the construction.

Specifically, there is provided an inlet port 1a on the upper side wall surface of the oil pan 1. Further, the inlet port 1a communicates on the inside thereof 1 with the oil passage 13a formed in the same manner as in the first embodiment.

A union nut 18 is welded on the outside of the inlet port 1a and a union screw 19 is fastened to the union nut 18 through a T-connector 20 and a gasket 21. The T-connector 20 is connected at the upper end thereof with the outlet pipe 12.

There is provided a passage 19a to communicate the T-connector 20 with the inlet port 1a in the union screw 19. Oil goes through the outer pipe 12, flows into the oil passage 13a formed by the inner wall of the oil pan 1 and the oil guide 13 via the passage 19a provided in the union screw 19 and is gushed out from the discharge port 13b in the direction of the suction port 3a of the oil strainer 3.

According to the second embodiment, since the outer pipe 12 is connected directly to the inlet port 1a provided in the oil pan 1, it is not necessary to apply a strict precision control for preventing oil leakage to the mating surface between the transmission case 2 and the oil pan 1 and as a result, the construction can be simplified and the manufacturing cost can be reduced.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An oil circulating apparatus of an automatic transmission having a transmission case, an oil pump, an oil cooler and an oil reservoir connected to said transmission case, for circulating a part of an oil to said oil pump through said oil cooler after said oil is sucked up by said oil pump and supplied to respective parts of said transmission, comprising;
   an oil passage provided downstream of said oil cooler;
   an oil strainer provided in said oil reservoir and connected with a suction side of said oil pump;
   a discharge port of said oil passage provided at a downstream and of said oil passage in the oil reservoir; and
   a suction port of said oil strainer provided opposite and adjacent to said discharge port;
   wherein a part of said oil passage is formed at an inside of and along an inner surface of said transmission case, and an other part of said oil passage is provided at an inside of and along an inner surface of said oil reservoir and connected with said part of said oil passage formed in said transmission case.

2. An oil circulating apparatus of an automatic transmission having a transmission case, an oil pump, an oil cooler and an oil reservoir connected to said transmission case, for circulating a part of an oil to said oil pump through said oil cooler after said oil is sucked up by said oil pump and supplied to respective parts of said transmission, comprising:

an oil passage provided downstream of said oil cooler;

an oil strainer provided in said oil reservoir and connected with the suction side of said oil pump;

a discharge port of said oil passage provided at a downstream end of said oil passage; and a suction port of said oil strainer provided opposite and adjacent to said discharge port; wherein said oil passage is provided inside of and along the inner surface of said oil reservoir; and wherein said oil passage is formed by a U-shaped guide spot-welded to the inner surface of said oil reservoir.

3. An oil circulating apparatus of an automatic transmission having a transmission case, an oil pump, an oil cooler and an oil reservoir connected to said transmission case, for circulating a part of an oil to said oil pump through said oil cooler after said oil is sucked up by said oil pump and supplied to respective parts of said transmission, comprising:

an oil passage provided downstream of said oil cooler;

an oil strainer provided in said oil reservoir and connected with a suction side of said oil pump;

a discharge port of said oil passage provided at a downstream end of said oil passage; and a suction port of said oil strainer provided opposite and adjacent to said discharge port;

wherein said oil passage is formed by a U-shaped guide spot-welded to an inner surface of said oil reservoir.

* * * * *